US012764231B2

(12) United States Patent
Malode et al.

(10) Patent No.: US 12,764,231 B2
(45) Date of Patent: Oct. 13, 2026

(54) METHOD AND PROCESS FOR OPTIMAL AGENT ALLOCATION

(71) Applicant: Freshworks Inc., San Mateo, CA (US)

(72) Inventors: Ravi Deepak Malode, Bangalore (IN); Bhaskar Ghosh Dastidar, Bangalore (IN); Jayanti Venkata Sai Kiran, Hyderabad (IN)

(73) Assignee: Freshworks Inc., San Mateo, CA (US)

( * ) Notice: Subject to any disclaimer, the term of this patent is extended or adjusted under 35 U.S.C. 154(b) by 165 days.

(21) Appl. No.: 18/676,306

(22) Filed: May 28, 2024

(65) Prior Publication Data

US 2025/0373731 A1 Dec. 4, 2025

(51) Int. Cl.
*H04M 3/523* (2006.01)
*H04M 3/51* (2006.01)

(52) U.S. Cl.
CPC ....... *H04M 3/5234* (2013.01); *H04M 3/5175* (2013.01)

(58) Field of Classification Search
CPC .......................... H04M 3/5234; H04M 3/5175
USPC ..... 379/265.11, 265.02, 265.01, 265.14, 242
See application file for complete search history.

(56) References Cited

U.S. PATENT DOCUMENTS 5,592,542 A * 1/1997 Honda .................. H04M 3/523 379/265.11
8,749,608 B2 * 6/2014 Zhan ...................... H04L 65/80 379/265.13
2007/0041551 A1 * 2/2007 Whitecotten ....... H04M 3/5233 379/212.01
2014/0341370 A1 * 11/2014 Li ....................... H04M 3/5232 379/265.14

* cited by examiner

*Primary Examiner* — Thjuan K Addy
(74) *Attorney, Agent, or Firm* — LeonardPatel PC; Sheetal S. Patel; Michael A. Leonard, II

(57) ABSTRACT

A computer-implemented method generally pertains to identifying, by a processor, available agents to receive calls from a plurality of callers within a network. In addition, the computer-implemented method further comprises arranging, by the processor, the available agents based on a number of ringing calls after a last call among the agents is answered. The available agents not receiving the ringing calls are identified to receive incoming calls. The computer-implemented method also includes inserting, by the processor, the available agents into a plurality of groups or batches to receive calls from the plurality callers. The computer-implemented process also includes providing one or more of the calls to the available agents in the plurality of groups or batches not receiving the ringing calls.

20 Claims, 4 Drawing Sheets

100

100

300

METHOD AND PROCESS FOR OPTIMAL AGENT ALLOCATION

FIELD

The present invention generally pertains to optimizing assigned calls in a network to available agents based on the least number of ringing calls among available batches of agents.

BACKGROUND

The allocation of agents in a contact center is essential to deliver excellent customer service and provide operational efficiency. The measuring of call center performance is essential to evaluate its efficiency, effectiveness, and overall success in providing excellent customer service. Consumers generally call these call centers and want their questions and concerns answered in an efficient manner. Various conditions may affect whether the customer's receive excellent service. The average handle time can play a factor. One factor, for example, is whether the agent answered the customer's needs in a timely manner. The average speed of the answer by agents also plays a factor. For example, did the agent answer all of the customer's questions in a short period of time or require a longer period of time. A more important issue can be the average wait time for the caller. For instance, are the callers placed on hold too long before being routed to an agent, and if so, are the agents overly burdened with their current incoming calls.

A need thereby exists to be able to efficiently route incoming calls to agents without placing too much of a burden on agents to take new calls. Calls should be routed to agents without agents being too burdened or without waiting too long before answering a call. In addition, a need exists for callers to be connected to agents without having to wait for an excessive amount of time to have their calls answered.

SUMMARY

Certain embodiments of the present invention may provide solutions to the problems and needs in the art that have not yet been fully identified, appreciated, or solved by current web-based chat products.

In one embodiment, a computer-implemented method includes identifying, by a processor, available agents to receive calls from a plurality of callers within a network. The computer-implemented method also includes arranging the available agents based on a number of ringing calls after a last call among the agents is answered. The available agents not receiving the ringing calls are identified to receive incoming calls. Further, the computer-implemented method also includes inserting all the identified available agents into a plurality of groups or batches. The computer-implemented method also includes providing one or more calls to the available calls to the available agents in the plurality of groups or batches not receiving the ringing calls.

In another embodiment, a system pertains to a memory comprising a set of instructions, wherein the set of instructions are configured to cause the at least one processor to arrange agents based on a number of ringing calls received by each of the agents within the batches, wherein the number of ringing calls are identified in an increasing order. Further, the set of instructions are configured to cause the at least one processor to determine based on the number of ringing calls, which of the agents in a call center are not receiving the ringing calls, wherein the agents are identified to be given preference to receive one or more new calls. The set of instructions are also configured to cause the at least one processor to provide the one or more new calls to batches of the agents not receiving the ringing calls.

In yet another embodiment, a computer program on a non-transitory medium causes a processor to identify calls incoming from a wait queue in a network. The computer program also causes the processor to arrange the agents based on a last call answered among the agents. In addition, the computer program also causes the processor to arrange the agents based on a number of ringing calls after arranging the agents based on the last call answered. An idle time of the agents not receiving a call is identified to provide preference to the agents with the idle time to receive the incoming calls. Further, the computer program pertains to cause the processor to provide the incoming calls to the agents given the preference based on the idle time.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

In some embodiments, the optimal agent allocation system (hereinafter the "system") may desire to place calls to agents that are available to receive calls, which arrive within a network. A series of calls may occur from callers within a network. These calls are rerouted to a waiting queue within the network.

The system or algorithm identities the available agents and then proceeds to arrange the agents by performing a series of checks as mentioned including identifying agents on the last call answered, the number of ringing calls, etc. The goal with this check is to identify which agents are currently receiving the least number of calls (most idle). The algorithm then identifies agents from the arranged list of agents from the previous step.

The time at which each agent answered the last (or previous) call is identified or recorded. After the last call answered is identified for each of the agents, the number of ringing calls for each agent is identified. The agents receiving the larger number of ringing calls and fewer idle time intervals are given less preference for new calls. In contrast, the agents receiving the fewest number of ringing calls and higher idle times are given greater preference for the new calls.

After arranging the agents, the agents can be inserted into batches. The batches of agents preferred to receive the new calls are identified from the algorithm identifying the agents with the fewest number of ringing calls.

Certain embodiments have multiple new calls that are within the waiting queue. In such embodiments, the algorithm assigns the first new call to the first identified batch of agents available to receive the call. Further, the next new call is offered to the next batch of available agents according to the fewest number of ringing calls identified. The new calls can be provided sequentially to the batches of agents who have been identified to have the fewest number of ringing calls.

Figure 1:
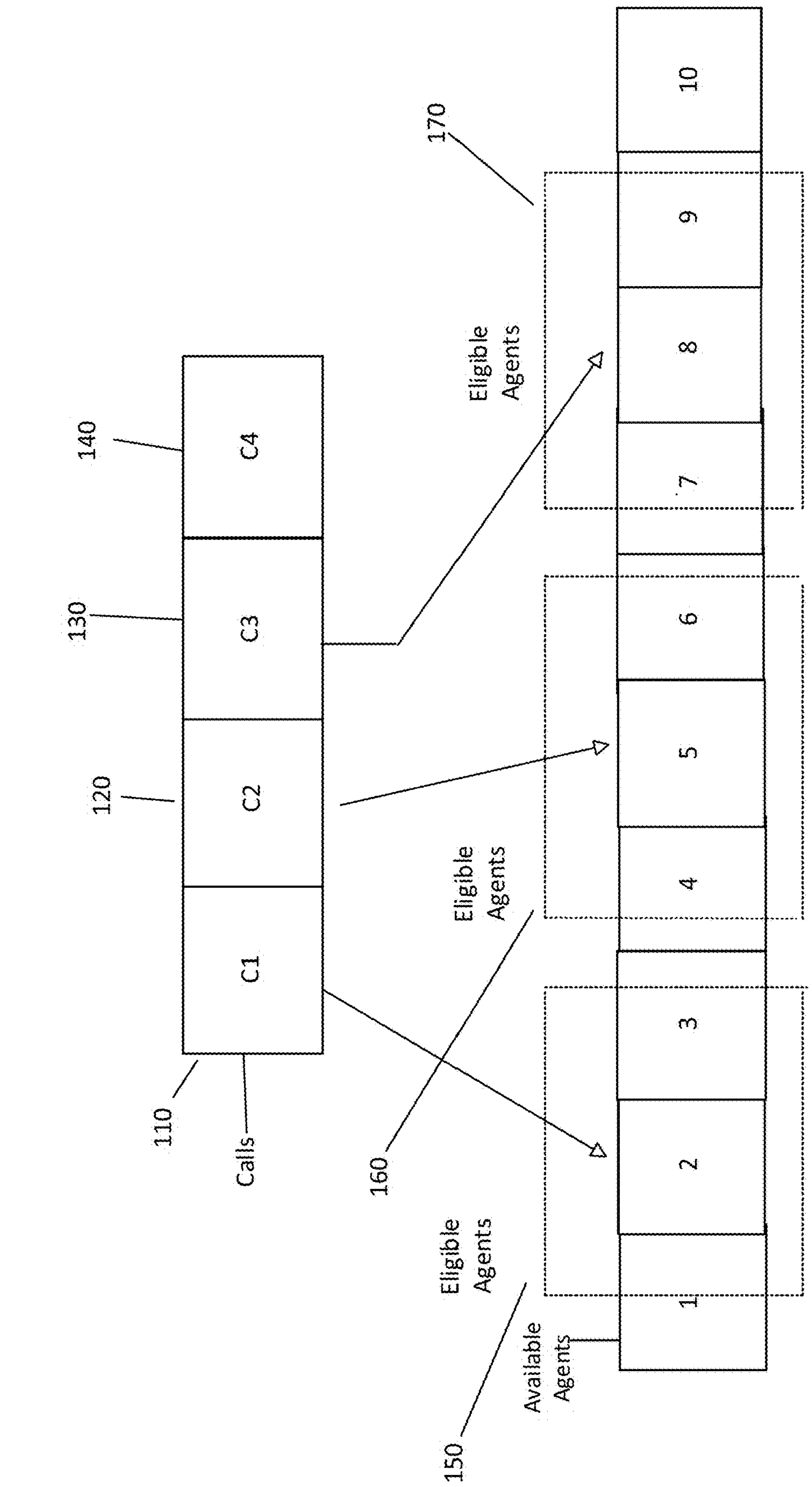
FIG. 1 is a block diagram illustrating the optimal agent allocation system in which calls are routed to available agents with fewer ringing calls than other agents, according to an embodiment of the present invention.

FIG. 1 illustrates network 100 in which a series of calls are incoming from a variety of callers within network 100, according to an embodiment of the present invention. The callers are looking to find an agent that can answer their questions and concerns. In many instances, callers need their calls answered in a quick and efficient manner without having to wait too long for an agent to respond. Within network 100, calls C1 110, C2 120, C3 130, and C4 140 are illustrated for convenience. In other networks, more than four calls can be shown to be coming within the network from a wait queue. In addition, within network 100, agents within batches 150, 160, and 170 may be eligible. For ease of explanation, three agents are shown for batch 150, 160, and 170. In other networks and embodiments, a batch can include more or less available agents to receive calls C1 110, C2 120, C3 130, and C4 140. In addition, in other embodiments, the size of the batch can increase or decrease based on the needs to answer incoming calls within network 100. Agents can be inserted into batches 150, 160, 170 after the agents are arranged based on a "last call answered" and "number of ringing calls."

When calls C1 110, C2 120, C3 130, C4 140 come in within network 100 and are within a waiting queue, network 100 may find all of the available agents. After finding the available agents, the algorithm applied within network 100 arranges all of the agents based on "a last call answered" in a decreasing order. As such, the time when each agent answers the call is noted. After the last call answered is noted for each agent, the algorithm applied to network 100 can arrange the agents based on a number of ringing calls in increasing order.

With respect to the number of ringing calls, number of ringing calls that is occurring for each agent is identified. The agents are arranged based on the number of ringing calls in increasing order. When an agent is on a current call, that agent is given lesser preference to receive any call than an agent that is facing idle time and not receiving any present calls. In an embodiment, the agents could each be receiving ringing calls. In those situations, the agent/agents that are receiving the lesser number of ringing calls are given preference to receive new incoming calls. The idle time of each agent is noted with respect to the number of ringing calls. The agents that have the highest amount of idle time are given the highest preference to receive the new incoming calls. The algorithm reduces the load of agents that are currently receiving ringing calls to ensure that agents having idle time are given the incoming calls. Optimal distribution of the incoming calls are ensured.

Once the agents that should be given preference to the incoming calls are identified based on the order of ringing calls, the agents are inserted into the respective batches 150, 160, 170. The algorithm can then provide the new calls to the identified agents within the batches 150, 160, 170. The call from the waiting queue is routed to the identified batch of agents. The batch of agents can be in any of batches 150, 160, 170.

Figure 2:
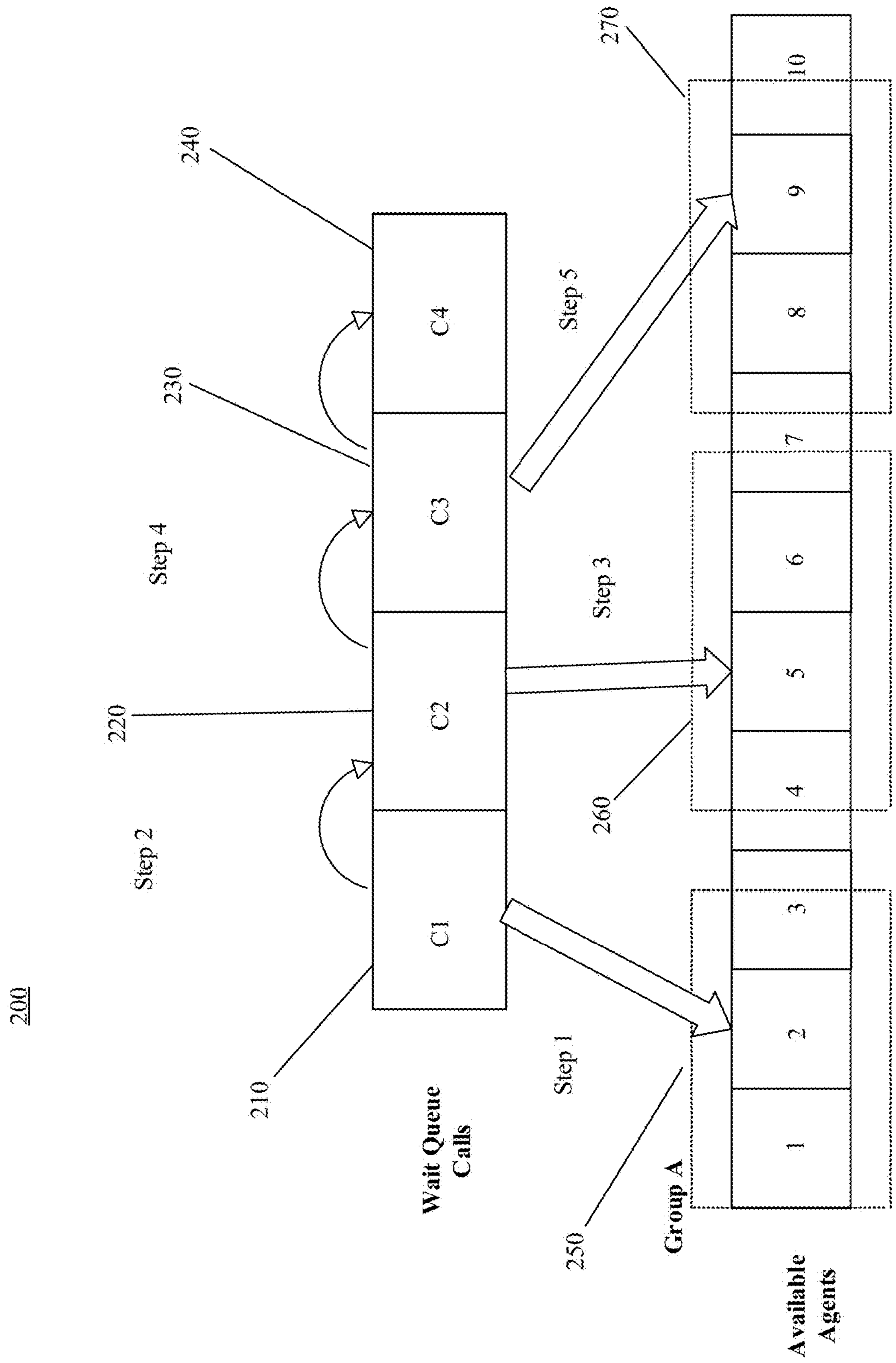
FIG. 2 is another block diagram illustrating how calls are routed to batches of agents that are available based on the number of ringing calls and how agents can be moved from one batch to another batch, according to an embodiment of the present invention.

Referring to FIG. 2, network 200 uses an algorithm to identify agents available to receive calls based on an optimal allocation of calls from a wait queue within network 200 according to an embodiment of the present invention. Network 200 includes calls C1 210, C2 220, C3 230, and C4 240 that are positioned within a wait queue within network 200. For ease of explanation, only four calls C1 210, C2 220, C3 230, and C4 240 are shown. In other embodiments, more than four calls can be part of network 200. Network 200 also includes batches 250, 260, and 270. After the agents are arranged based on a last call answered and the number of ringing calls, the agents are inserted into batches 250, 260, 270. The order of the calls can be distributed to agents after the number of ringing calls is answered.

When initial call C1 210 comes in, the optimal allocation algorithm may alert network 200 to identify all of the available agents. After identifying the agents, the agents are arranged based on the last call answered. The time of the last call answered by each of the agents is identified in descending order. After the time of the last call answered is identified for each agent, the number of ringing calls is identified for each agent. The agents receiving the fewest number of ringing calls, or having the highest idle time from the last call answered can be identified. After the identification occurs, the agents are arranged into batches 250, 260, 270 accordingly. Once these agents are inserted within corresponding batch 250, 260, or 270, new call C1 210 can be provided to batch 250 of available agents.

Once first new call C1 210 is offered to the batch 250, there can be other incoming new calls C2 220, C3 230, and C4 240 that need to be assigned to batches of agents. As such, the optimal allocation algorithm will not stop at call C1 210. The optimal allocation algorithm can instruct network 200 to then assign next call C2 220 which is in the wait queue to batch 260 that has available agents that were identified by the fewest number of ringing calls. Further, more incoming calls can be in the wait queue after call C2 220 is assigned to batch 260. As such, third call C3 230 can be assigned to the next set of available agents in batch 270. Further, new call C4 240 can thereby be assigned to the next set of available agents in another batch of available agents. Once the available agents are identified for preference to new calls based on the number of ringing calls in increasing order and inserted in respective batches, the new calls in the wait queue in the order in which they were received can be assigned to the next batch of available agents.

Figure 3:
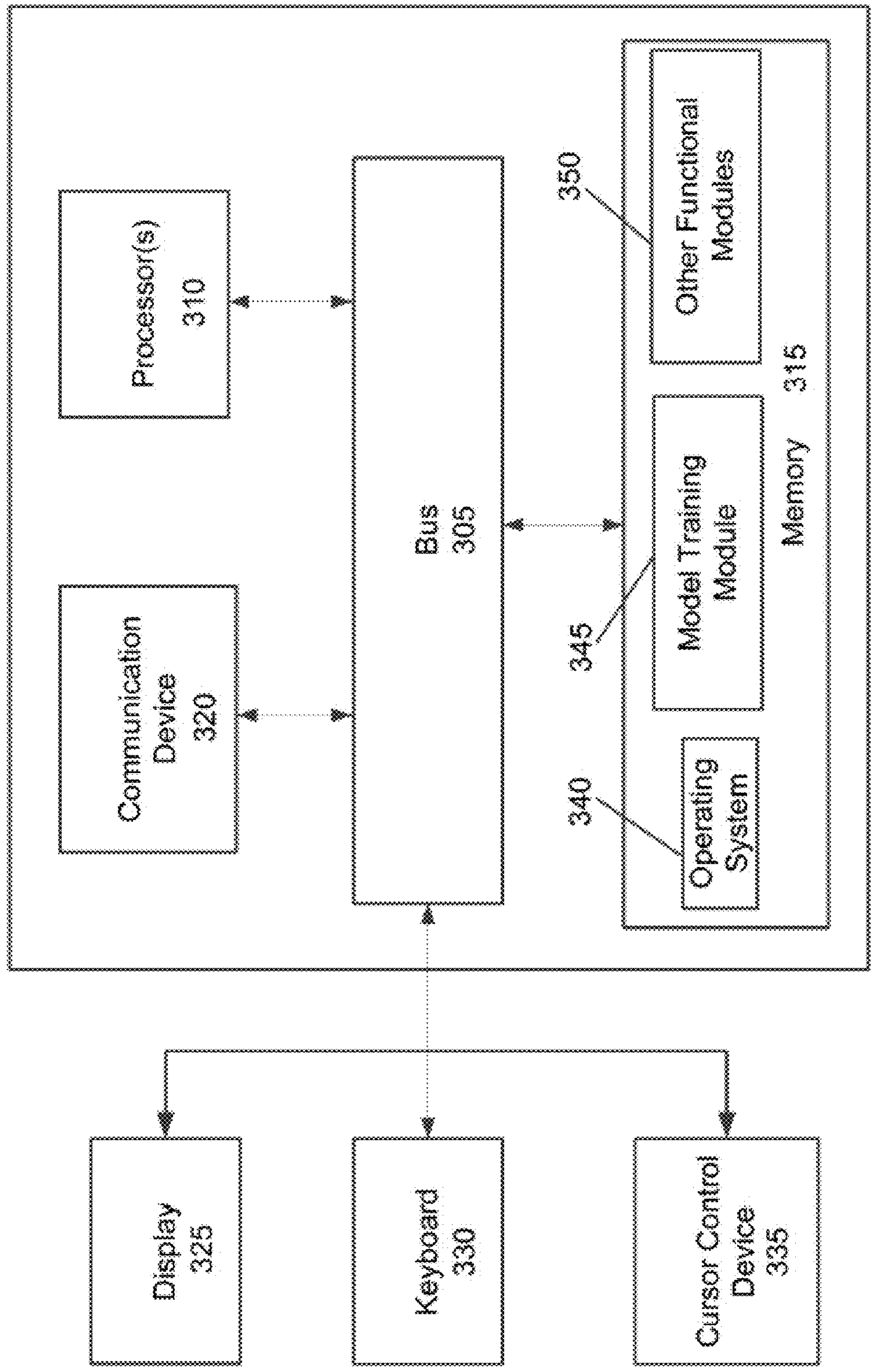
FIG. 3 is an architectural diagram illustrating a computing system configured to route calls to batches of agents based on a preference given to agents receiving the least number of ringing calls, according to an embodiment of the present invention.

FIG. 3 is an architectural diagram illustrating a computing system 300 configured to perform label biasing of data associated with closed deals using interpolation, according to an embodiment of the present invention. In some embodiments, computing system 300 may be one or more of the computing systems depicted and/or described herein. Computing system 300 includes a bus 305 or other communication mechanism for communicating information, and processor(s) 310 coupled to bus 305 for processing information. Processor(s) 310 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 310 may also have multiple processing cores, and at least some of the cores may be configured to perform specific functions. Multi-parallel processing may be used in some embodiments. In certain embodiments, at least one of processor(s) 310 may be a neuromorphic circuit that includes processing elements that mimic biological neurons. In some embodiments, neuromorphic circuits may not require the typical components of a Von Neumann computing architecture.

Computing system 300 further includes a memory 315 for storing information and instructions to be executed by processor(s) 310. Memory 315 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 310 and may include volatile media, non-volatile media, or both. The media may also be removable, non-removable, or both.

Additionally, computing system 300 includes a communication device 320, such as a transceiver, to provide access to a communications network via a wireless and/or wired connection. In some embodiments, communication device 320 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 320 may include one or more antennas that are singular, arrayed, phased, switched, beamforming, beamsteering, a combination thereof, and or any other antenna configuration without deviating from the scope of the invention.

Processor(s) 310 are further coupled via bus 305 to a display 325, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 325 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 330 and a cursor control device 335, such as a computer mouse, a touchpad, etc., are further coupled to bus 305 to enable a user to interface with computing system. However, in certain embodiments, a physical keyboard and mouse may not be present, and the user may interact with the device solely through display 325 and/or a touchpad (not shown). Any type and combination of input devices may be used as a matter of design choice. In certain embodiments, no physical input device and/or display is present. For instance, the user may interact with computing system 300 remotely via another computing system in communication therewith, or computing system 400 may operate autonomously.

Memory 315 stores software modules that provide functionality when executed by processor(s) 310. The modules include an operating system 340 for computing system 300. The modules further include model training module 345 that is configured to perform all or part of the processes described herein or derivatives thereof. Computing system 300 may include one or more additional functional modules 350 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 4:
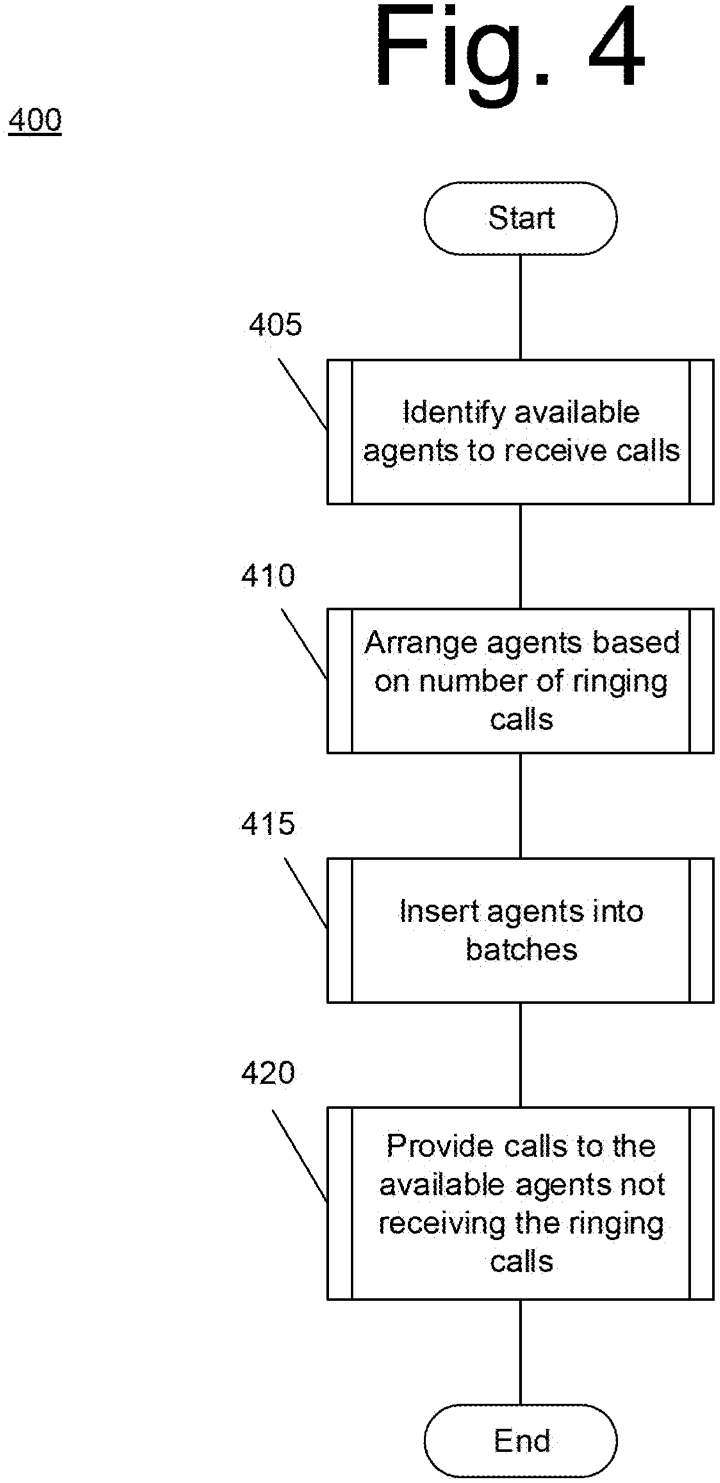
FIG. 4 is a flow diagram illustrating a method for allocating calls to batches of agents based on a preference given to the agents with the least number of ringing calls, according to an embodiment of the present invention.

FIG. 4 is a flow diagram illustrating a method 400 for allocating calls to batches of agents based on a preference given to the agents with the least number of ringing calls according to an embodiment of the present invention. In some embodiments, calls are received within the waiting queue, and then all of the available agents in the call center are identified at 405. In this instance, the available agents are identified, i.e., the ones that can potentially be available to receive calls from a plurality of callers. At 410, the agents are then arranged. Moreover, the agents are arranged on the last call answered, i.e., the time where each agent answered the call is noted. In some embodiments, the agents are arranged based on the number of ringing calls in increasing order. For example, agents with the higher number of ringing calls are given less preference to receive the new calls. The agents with the fewest number of ringing calls and most idle time are given greater preference to receive the incoming calls. At 415, the identified agents with the greater preference to receive the incoming calls are then inserted into batches. Then at 420, the new calls from the wait queue are provided to the batches of the identified agents not receiving calls or receiving the fewest number of ringing calls. The new calls will be assigned in the order in which they were received.

The process steps performed in FIGS. 1, 2, and 4 may be performed by a computer program, encoding instructions for the processor(s) to perform at least part of the process(es) described in FIGS. 1, 2, and 4, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 310 of computing system 300 of FIG. 3) to implement all or part of the process steps described in FIGS. 1, 2, and 4, which may also be stored on the computer-readable medium.

In some embodiments, the computer program can be implemented in hardware, software, or a hybrid implementation. The computer program can be composed of modules that are in operative communication with one another, and which are designed to pass information or instructions to display. The computer program can be configured to operate on a computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method comprising:

identifying, by a processor, available agents to receive calls from a plurality of callers within a network;

arranging, by the processor, the available agents based on a number of ringing calls after a last call among the agents is answered, wherein the available agents not receiving the ringing calls are identified to receive incoming calls;

inserting, by the processor, the available agents into a plurality of groups or batches to receive calls from the plurality callers, wherein each of the plurality of groups or batches comprises one or more of the available agents and each of the plurality of groups or batches is assigned to a corresponding incoming call; and providing, by the processor, one or more of the calls to the available agents in the plurality of groups or batches not receiving the ringing calls.

2. The computer-implemented method of claim 1, further comprising:

arranging, by the processor, the available agents based on idle time.

3. The computer-implemented method of claim 1, further comprising:

providing, by the processor, the one or more calls to the available agents within a same group or batch among the plurality of groups or batches.

4. The computer-implemented method of claim 1, further comprising:

sending, by the processor, a notification to the available agents that are offered the one or more calls.

5. The computer-implemented method of claim 1, further comprising:

assigning, by the processor, an additional call to another group or batch of agents after a previous call has been offered to a first group or batch of agents.

6. The computer-implemented method of claim 1, further comprising:

identifying, by the processor, an idleness level of the available agents before offering the one or more calls.

7. The computer-implemented process of claim 1, further comprising:

identifying, by the processor, a number of ringing calls before the one or more calls are offered.

8. A system comprising:

at least one processor; and a memory comprising a set of instructions, wherein the set of instructions are configured to cause the at least one processor to:

arrange agents based on a number of ringing calls received by each of the agents, wherein the number of ringing calls are identified in an increasing order;

determine based on the number of ringing calls, which of the agents in a call center are not receiving the ringing calls, wherein the agents are identified to be given preference to receive one or more new calls, wherein each agent is associated with one of a plurality of groups or batches and each of the plurality of groups or batches is assigned to a corresponding incoming call; and provide the one or more new calls to batches of the agents not receiving the ringing calls.

9. The system of claim 8, wherein the set of instructions are configured to cause the at least one processor to arrange the agents within the identified batches based on a last call answered.

10. The system of claim 8, wherein the set of instructions are configured to cause the at least one processor to reduce a load of the number of ringing calls to the batches of agents.

11. The system of claim 8, wherein the set of instructions are configured to cause the at least one processor to identify idle time for at least one of the agents within the identified batches.

12. The system of claim 8, wherein the set of instructions are configured to cause the at least one processor to identify each agent not occupied with the number of ringing calls.

13. The system of claim 8, wherein the set of instructions are configured to cause the at least one processor to identify multiple agents within the identified batches of agents to receive the one or more new calls based on the identified number of ringing calls.

14. The system of claim 8, wherein the set of instructions are configured to cause the at least one processor to provide the preference to the one or more new calls based on an idle time of one or more agents within the identified batches of agents.

15. A computer program embodied on a non-transitory computer readable medium, the computer program configured to cause a processor to:

identify calls incoming from a wait queue in a network;

arrange agents based on a last call answered among the agents;

arrange the agents based on a number of ringing calls after arranging the agents based on the last call answered, wherein an idle time of the agents not receiving a call is identified to provide preference to the agents with the idle time to receive the incoming calls; and provide the incoming calls to the agents given the preference based on the idle time.

16. The computer program of claim 15, wherein the processor is configured to provide the preference to the agents receiving fewer ringing calls to receive the incoming calls.

17. The computer program of claim 15, wherein the processor is configured to reroute incoming calls to a different batch of agents based on the number of ringing calls.

18. The computer program of claim 15, wherein the processor is configured to arrange the agents based on an increasing order of the number of ringing calls.

19. The computer program of claim 15, wherein the processor is configured to identify a number of calls for each agent before the incoming calls are provided.

20. The computer program of claim 15, wherein the processor is configured to reroute incoming calls to the agents with a lesser number of the ringing calls.

* * * * *